United States Patent [19]

Anderson

[11] Patent Number: 4,779,831
[45] Date of Patent: Oct. 25, 1988

[54] HOLDER FOR BEVERAGE CONTAINER

[76] Inventor: Darryl L. Anderson, 7630 N. Massingale, Tucson, Ariz. 85741

[21] Appl. No.: 129,610

[22] Filed: Dec. 7, 1987

[51] Int. Cl.$^4$ .............................................. A47K 1/08
[52] U.S. Cl. ............................... 248/311.2; 248/205.2
[58] Field of Search ................... 248/205.2, 311.2, 313, 248/310, 314; 220/85 H; 224/148, 42.45 R; 108/46, 45

[56] References Cited

U.S. PATENT DOCUMENTS

| | | | |
|---|---|---|---|
| D. 226,623 | 4/1973 | Shuford. | |
| D. 259,835 | 7/1984 | Page. | |
| D. 264,525 | 5/1982 | Page. | |
| 2,698,155 | 12/1954 | Bowman | 248/311.2 |
| 3,532,318 | 10/1970 | Lloyd | 248/311.2 |
| 4,103,510 | 8/1978 | Hall. | |
| 4,478,052 | 10/1984 | McDowell. | |
| 4,505,448 | 3/1985 | Massie | 248/313 |
| 4,548,375 | 10/1985 | Moss | 248/205.2 |
| 4,557,452 | 12/1985 | Khuong | 248/311.2 X |
| 4,606,523 | 8/1986 | Statz. | |
| 4,629,153 | 12/1986 | Marcum | 248/558 |
| 4,634,089 | 1/1987 | Wright. | |
| 4,653,289 | 3/1987 | Hodgetts. | |
| 4,655,425 | 4/1987 | Wallace | 248/311.2 |

FOREIGN PATENT DOCUMENTS 596543 5/1934 Fed. Rep. of Germany ... 248/311.2

Primary Examiner—J. Franklin Foss
Attorney, Agent, or Firm—J. Michael McClanahan

[57] ABSTRACT

A holder for beverage containers adapted to be secured in front of an automobile dashboard air conditioning vent consisting of means to hold the beverage container having a circular split ring to receive the beverage container and a base member operably attached to the annular ring to support the beverage container bottom. Cooled air directing vanes attached to the circular split ring assist in directing cooled air from the automobile air conditioning vent to the sides of the container. Attached to the circular split ring is a vertically rising bifurcated shank member which in turn continues into a flexible handle. The underside of the flexible handle is covered with Velcro fastener material to engage a similar Velcro fastener material glued to the automobile dashboard immediately above the air conditioning vent. The device is placed over the air conditioning vent and secured there by wrapping the flexible handle over the dashboard such that the Velcro fastener on the bottom portion of the flexible handle engages the Velcro fastener attached to the automobile dashboard.

9 Claims, 1 Drawing Sheet

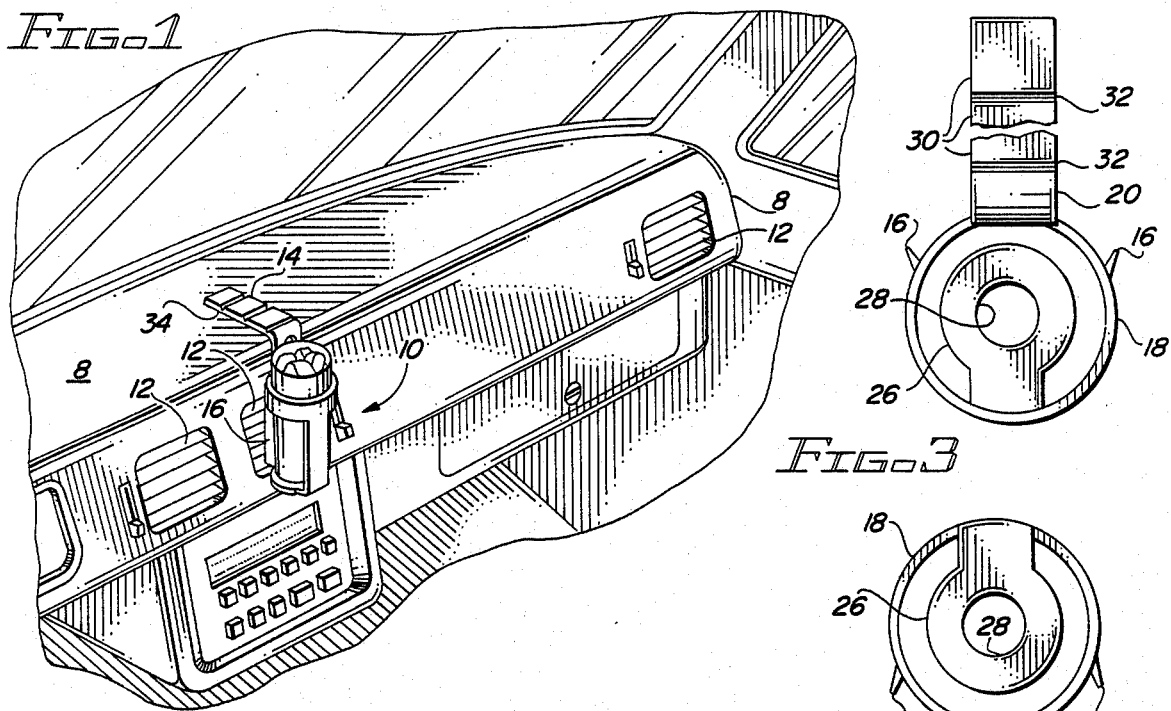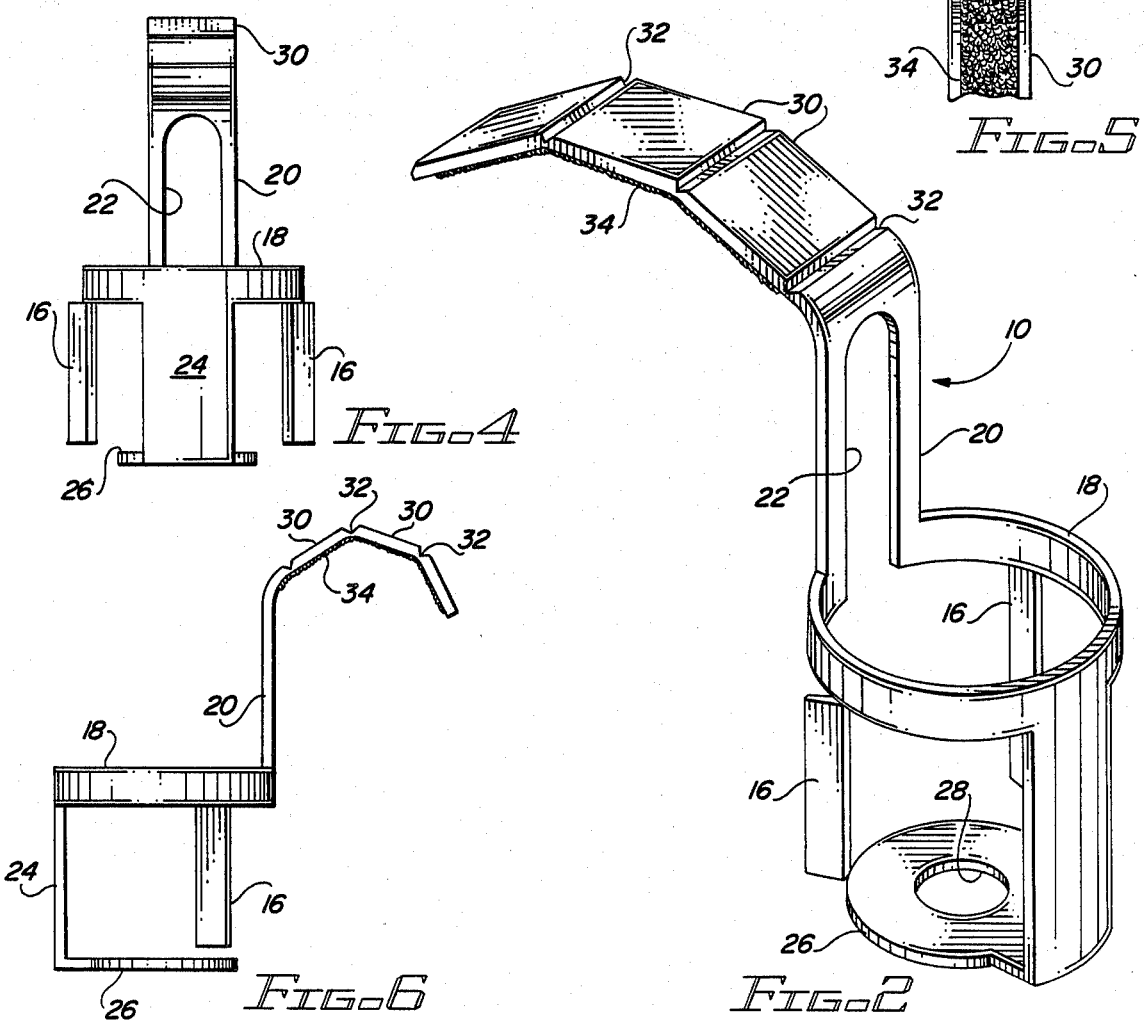

HOLDER FOR BEVERAGE CONTAINER

BACKGROUND OF THE INVENTION

1. Field of the Invention

The field of the invention is devices for securing and holding beverage containers in automobiles.

2. Description of the Related Art

In recent years with the popularity of consumption of soft drinks, especially while traveling in automobiles, it has become widespread to provide various mechanisms and devices to hold and secure beverage containers. This has become especially helpful during those periods of time when the automobile driver or passenger are not actively holding and drinking the beverage. In this respect, various molded plastic cup holders have been devised, consisting generally of cylindrical sockets with an upright and supporting hook adapted to engage over a rail or an automobile door.

Cup holders of this design have been disclosed in the U.S. Patents to Shuford, Design Pat. No. 226,623; to Statz, U.S. Pat. No. 4,606,523; and to Wright, U.S. Pat. No. 4,634,089. In these three patents, a molded plastic cup holder is generally characterized as a hollow cylindrical socket adapted to receive the lower portion of a beverage container with an attached supporting hook to engage an automobile door. Various refinements are added to the various devices, such as using spring back surrounding arms to firmly grip the cup and to provide for variously sized cups.

It is also useful if the cup holder or beverage container holder may also provide means to keep the beverage cold over the period of time that the drink is being consumed or, if the beverage initially were warm, to cool it off and make it's taste more enjoyable. In that respect, Hodgetts, in U.S. Pat. No. 4,653,289 has invented a ventilator-mounted receptacle adapted to encompass the automobile air conditioning vent and to direct air into a almost completely enclosed plenum which houses a container of the beverage. Hodgetts' device includes means for attaching to the automobile vent in order for the receptacle to be hung in position spaced from the vent. The device to Hodgetts appears to adequately accomplish the task set out, however, it requires reworking of the automobile dash in the area proximate the air conditioning vent. In addition, the device of Hodgetts totally encompasses the air conditioner vent and substantially restricts the flow of cooled air from the vent since all cooled air must exit an opening in the device which may be less than five percent of the area of the air conditioning vent. Obviously then, very little cooled air actually is applied to cooling the container.

While there is apparent advantage of utilizing an automobile air conditioning system to cool down the beverage in a container, or to maintain the beverage in a cold state, it would be useful if the holder for the beverage container would be of rather simple construction and would be easy to apply to the vehicle, to use and can be completely removed from in front of the air conditioning vent when not in use.

SUMMARY OF THE INVENTION

This invention relates to a holder for beverage containers adapted to position the container proximate the air conditioning vent located on an automobile dashboard to permit the cooled air exiting the vent to impact the container to flow around the container, and thereby remove heat from the container and thus the beverage inside.

To this end, the holder is constructed to remove all barriers possible to the free flow of cooled air upon and around the container, and in addition, does additionally provide vanes to direct the cooled air to the container and thereby effectively enlarge the area from which cooled air is drawn.

More specifically, the invention comprises a generally split circular ring adapted to receive the beverage container, the ring connected to an annular flat base member by a vertical front connecting member, the front connecting member attached to the annular split ring and the base member at a point opposite the point proximate the automobile vent and the flow of cooled air. Attached to the ring are a pair of vanes situated on opposite sides of the ring generally in the space between the ring and the base member, the vanes adapted to gather in and direct cooled air from the air conditioning vent to the beverage container. The split ring is then connected with a vertical shank at the split, the vertical shank located generally opposite the front connecting member, the shank rising up to roll over into a flexible supporting handle adapted to be attached to the automobile dashboard immediately above the air conditioning vent. The vertical shank is characterized by a centrally located elongated slot to bifurcate the shank, each side of the bifurcated shank attaching to a side of the split ring, the bifurcation limiting the flexibility of the split ring, and also permitting the flow of cooled air from the vent through the elongated slot to the beverage container.

On the underside of the flexible handle is adhesive backed Velcro fastening material designed to engage similar Velcro fastening material fixed to the automobile's dashboard immediately above the vent. The flexible handle is an elongated handle with transverse spaced apart indentations which positionally reduce the thickness of the material and thereby provide hinges in order that the handle may fully engage the dashboard Velcro fastener and conform to roundness of the automobile dashboard.

It is an object of the subject invention to provide a holder for beverage containers proximate the air conditioning vent of an automobile.

It is another object of the subject invention to provide a holder for beverage containers which utilizes the automobile dashboard as means for placing the holder immediately in front of the air conditioning vent.

It is still another object of the subject invention to provide a holder for beverage containers wherein maximum exposure of the beverage container to cooled air.

It is still another object of the subject invention to provide a holder for beverage containers in order to take containers of varied diameters.

Other objects of the invention will in part be obvious and will in part appear hereinafter. The invention accordingly comprises the apparatus and method comprising the construction, combination of elements, and arrangement of parts which are exemplified in the following detailed disclosure, and the scope of the Application which will be indicated.

BRIEF DESCRIPTION OF THE DRAWINGS

For further understanding of the nature and objects of the present invention, reference should be had to the following detailed description taken in connection with the accompanying drawings wherein:

FIG. 1 is a perspective view of the invention in place proximate an automobile air conditioning vent;

FIG. 2 is a perspective view of the subject holder for beverage container;

FIG. 3 is a top view of the subject holder for beverage container;

FIG. 4 is a front view of the subject holder for beverage container;

FIG. 5 is a bottom view of the subject holder for beverage container; and

FIG. 6 is a side view of the subject holder for beverage container.

In various views, like index numbers refer to like elements.

DETAILED DESCRIPTION OF THE PREFERRED EMBODIMENT

Referring now to FIG. 1, a perspective view of the inventive holder for beverage container is shown in place on an automobile passenger dashboard in front of the air conditioning vent. More particularly, holder 10 is held over the automobile air conditioning vent 12 by means of flexible handle 30 attached to holder 10. Attached to the underside of flexible handle 30 is a strip of Velcro fastener material 34 which engages a similarly located strip of Velcro fastener material preferably glued to the automobile dashboard 8. Holder 10 is characterized as presenting minimal obstruction between the automobile air conditioning vent 12 cooled air and the beverage can that holder 10 is adapted to hold and secure. In addition, vanes 16 are attached to holder 10 to enlarge the area that the cooled air is drawn from the automobile air conditioning vent and directing that air to the sides of the held beverage container.

FIG. 2 is a perspective enlarged view of the subject holder for beverage container 10 showing in much better detail the elements which comprise the invention. Firstly, the device has a split upper circular or annular ring 18 which is broken only for the vertical bifurcated shank member 20 which joins ring 18 on either side of the split and, through an elongated slot 22 formed in vertical bifurcated shank 20, limits the flexibility of annular ring 18 to expand or contract in diameter. In addition, elongated slot 22 permits the passage of cooled air from the vent to the container. Attached to circular split ring 18 in the forward portion is down extending vertical front connecting member 24 whose purpose is to suspend bottom or base member 26 generally below annular ring 18 in order to provide bottom support to the beverage container interiorly to annular ring 18. Front connecting member 24 is placed opposite bifurcated shank member 20 on circular split ring 18. Interiorly to annular flat base member 26 is central opening 28 which permits the securing of objects other than beverage cans with flat bottoms, such as an object having a cone shape, for example, an ice cream cone.

A pair of vanes 16 attaches to the lower rim portion of circular ring 18 for directing the cooled air conditioned air to the sides of the beverage container. Vanes 16 comprise elongated plates which extend to a point proximate the bottom or base member 26 but do not, in the preferred embodiment, touch bottom 26. Of course, there is no reason why vanes 16 could not contact the bottom 26 and if additional stability were required, vanes 16 can be extended and bottom 26 sufficiently enlarged to join to the lower end of vanes 16.

Proceeding upward, connecting with circular ring 18 is front vertical bifurcated shank 20 which has, at its upper end, the flexible portion of handle 30 comprising, in the preferred embodiment, an elongated plastic piece wherein transverse notches have been formed at spaced intervals to provide a plurality of hinge sections separated by hinges 32 to permit handle 30 to conform to the shape of the automobile dashboard upon which it lays. Flexible handle 30 may be thought of as comprising both the hinged sections and the bifurcated shank portion. Immediately underneath flexible handle 30 hinge sections is a single piece of Velcro type fastener material 34 which runs under the hinged sections. As indicated in the discussion concerning FIG. 1, Velcro fastener 34 is adapted to engage a similar piece of Velcro fastener material permanently glued to the upper portion of the automobile dashboard.

Of course, any means could be used to attach the flexible handle to the dashboard, such as an adhesive.

The function and purpose of the subject invention is thus apparent from FIGS. 1 and 2 and its intended location in the path of cooled air conditioned air exiting from an automobile dashboard vent.

Various different views of the subject invention are shown in the following FIGS. 3-6. For example, FIG. 3 shows a top view of the invention showing firstly the circular or annular ring 18 designed to surround the held beverage container, the base member 26 immediately below circular ring 18, and central opening 28 located in the mid-portion of bottom 26. Protruding from opposite sides of annular ring 18 are air vanes 16 designed to direct the cooled air to the sides of a held beverage container. Vertical bifurcated shank member 20 is shown attached to annular ring 18, shank member 20 continuing into flexible handle 30 and flexible handle 30 being divided at spaced intervals by formed hinges 32.

FIG. 4 is a front view of the subject invention showing, commencing from the bottom, firstly flat annular base member 26 attached to front connecting member 24, which in turn is attached to annular ring 18. Similarly attached to annular ring 18 are the air vanes 16. Behind and to the rear of annular ring 18 is vertical bifurcated shank member 20 with its elongated slot 22, vertical member 20 then rising to form flexible handle 30.

FIG. 5 shows a bottom view of the subject invention detailing circular ring 18 surrounding base member 26 in the forefront with central opening 28 therethrough. Attached to circular ring 18 are air vanes 16 pointing in the direction of handle 30. Lastly, and shown on the underside of flexible handle 30 is the Velcro fastener material 34.

Finally, FIG. 6 illustrates the subject invention seen in a side view. Starting from the lower portion of FIG. 6, base member 26 attached to front connecting member 24 is shown, connecting member 24 continuing up to attach to split circular ring 18. Next, and running downward from annular ring 18 is air vane 16, air vane 16 almost dropping to bottom 26. On the far right hand side of circular ring 18 is vertical bifurcated shank member 20 which rolls into flexible handle 30, handle 30 being made flexible by means of a plurality of hinges 32 formed in the handle. Lastly, Velcro fastener material 34 is shown attached to the bottom side of flexible handle 30 by an appropriated adhesive.

In the preferred embodiment shown and described in FIGS. 1 through 6, it has been found that the best material utilized in the construction of the device has been semi-rigid plastic, however, the plastic must be capable of flexing at the point where the plastic is thinned such as at the location of hinges 32. The device may be formed in one single molding operation wherein the only addition necessary for a completed product is the attachment of the Velcro fastener. As an alternate method of construction, the various parts of the device may be formed separately and then attached by appropriate plastic adhesive. Lastly, various parts may be formed as one single part and then joined with other individual parts.

By the specified construction of the preferred embodiment, maximum circulation of cooled air from automobile dashboard vent around the beverage container is accomplished since measures have obviously been taken to reduce obstructions to the air flow. For example, the circular ring is split in the area which will be immediately in front of the vent, and even the vertical shank which connects the split ring with the flexible handle is bifurcated by means of an elongated slot to provide the dual function of permitting cooled air flow through the shank, and to limit flexibility of the circular ring. The vanes on the sides of the split ring effectively enlarge the area over which cooled air is drawn to direct the air to the sides of the container. Lastly, the front vertical connecting member which attaches the base member to the split ring is situated at a point opposite the automobile dashboard vent so as not to pose an obstruction to the cooled air flow.

While a preferred embodiment has been shown and described, it will be understood that there is no intent to limit the invention by its disclosure, but rather it is intended to cover all modifications and alternate constructions falling within the spirit and the scope of the invention as defined in the appended claims.

I claim:

1. A holder for a beverage container adapted to be secured in front of an automobile dashboard air conditioning vent comprising:
   a circular split ring to receive and surround an associated beverage container;
   a flexible handle operably attached to said circular split ring, said handle defining in part a bifurcated shank member, said handle adapted to conform to and to be attached to the automobile dashboard;
   a base member operably attached to said circular split ring, said base member adapted to support the beverage container; and
   a front connecting member attached to said circular split ring and to said base member, said front connecting member spacially separating said circular split ring and said base member and suspending said base member immediately below said circular split ring, and said front connecting member attached to said split ring situated opposite said flexible handle attached to said split ring whereby the associated beverage container is supported interiorly to said circular split ring by said base member and thereby secured in front of an automobile dashboard air conditioning vent in order to cool the beverage contained in the container.

2. The holder for a beverage container as defined in claim 1 wherein said bifurcated shank member attached to said circular split ring defines said bifurcated shank member being attached to said circular split ring on opposite sides of said split.

3. The holder for a beverage container as defined in claim 2 wherein said flexible handle defines in part a handle consisting of hinged sections.

4. The holder for a beverage container as defined in claim 1 further including a plurality of vanes attached to said split ring, said vanes adapted to direct cooled air from the dashboard air conditioning vent to the beverage container in order to cool the beverage therein.

5. The holder for a beverage container as defined in claim 3 wherein said flexible handle includes means to attach said flexible handle to the automobile dashboard.

6. The holder for a beverage container as defined in claim 5 wherein said means adapted to attach said flexible handle to the automobile dashboard includes an adhesive means, said adhesive adapted to adhere said flexible handle to the automobile dashboard.

7. The holder for a beverage container as defined in claim 5 wherein said means to attach said flexible handle to the automobile dashboard comprises a pair of Velcro strips, one of said strips adapted to be attached to said flexible handle and the other of said Velcro strips adapted to be attached to the automobile dashboard whereby said Velcro strips may be brought together to secure said flexible handle to the automobile dashboard.

8. The holder for a beverage container as defined in claim 1 wherein said base member defines a circular plate.

9. The holder for a beverage container as defined in claim 8 wherein said base member circular plate includes a centrally located circular opening therein, said circular opening adapted to receive and encompass an associated pointed beverage container.

* * * * *